United States Patent [19]

Cook et al.

[11] 4,184,802
[45] Jan. 22, 1980

[54] FRONT LOADER VEHICLE FOR LOADING AIRCRAFT

[75] Inventors: Richard J. Cook, Hayti; Richard Reade, Caruthersville, both of Mo.

[73] Assignee: Mid-Continent Aircraft Corporation, Hayti, Mo.

[21] Appl. No.: 854,683

[22] Filed: Nov. 25, 1977

[51] Int. Cl.² .................................................. B66F 9/00
[52] U.S. Cl. .................................. 414/680; 251/305; 414/572; 414/683
[58] Field of Search ............. 214/130 R, 130 B, 41 R; 222/164, 167, 556, 608; 298/17 B, 27; 251/305–308, 286; 414/572, 680, 683

[56] References Cited

U.S. PATENT DOCUMENTS

| | | | |
|---|---|---|---|
| 2,946,553 | 7/1960 | Adam | 251/307 X |
| 3,672,724 | 6/1972 | Neuzil | 214/130 R X |
| 3,813,124 | 5/1974 | Roland | 298/17 B |

FOREIGN PATENT DOCUMENTS

| | | | |
|---|---|---|---|
| 22004 | 4/1921 | France | 214/41 R |
| 12241 | of 1905 | United Kingdom | 251/305 |

OTHER PUBLICATIONS

Planemate Hydro Loader; published by Mid-Continent Planemate Support Systems of Hayti, Mo. in Jan., 1976.

*Primary Examiner*—Stephen G. Kunin
*Assistant Examiner*—George F. Abraham
*Attorney, Agent, or Firm*—Le Blanc, Nolan, Shur & Nies

[57] ABSTRACT

A truck vehicle carried boom and hopper system for lifting, transporting, and depositing a load of particulate material such as powder, granules or seeds into storage bins in material dispensing aircraft, including a hopper boom framework having spaced apart side bars pivotally mounted on the side bars on the front end of the vehicle mounted support structure. An extensible piston-cylinder hydraulic motor system is utilized to obtain various pivotal positions of the hopper boom. A manual hopper control valve is located in the bottom of the hopper, the hopper is pivotally mounted on a horizontal axis on the extended end of the boom and a safety bar is secured to a mid-portion of the boom to enable a safety block when the boom is in the aircraft loading position. Between the boom pivotal mounting on the truck frame and the truck frame is a trussed frame support construction which enables rigid pivotal support of the boom and hopper. An auxiliary hydraulic control cylinder is connected in an extensible brace link to the pivoted hopper to control its tilt position relative to the ground in whichever position the boom is placed.

8 Claims, 8 Drawing Figures

FRONT LOADER VEHICLE FOR LOADING AIRCRAFT

BACKGROUND OF THE INVENTION

The present invention relates to improvements in truck type vehicles which include a front end loading hopper and boom to enable lifting, transporting, and depositing loads of particulate material into dusting or particulate material dispensing aircraft. While the basic idea of a box frame front end boom with pivotally carried hopper has been previously used, it has become highly desirable that hopper level control and dispensing from the hopper be more convenient and versatile along with safety features pertaining to boom adjustment, particularly when the loader is used adjacent and close to material dispensing aircraft which are suceptible to damage. This present invention provides improvements in such factors.

Insofar as can be determined the closest prior art patents are similar to the following U.S. Patents: G. R. Dempster et al U.S. Pat. No. 3,138,275 to a Front End Loader; C. E. Rouse U.S. Pat. No. 3,232,460 to a Concrete Hoisting and Placing Apparatus; C. R. Thatches U.S. Pat. No. 3,276,610 to Loading Device for Pickups and Other Vehicles; and R. C. Jones U.S. Pat. No. 4,026,441 to a Roof-Gravel Removal Apparatus. The only front end loaders found were similar to those depicted in noted U.S. Pat. No. 3,138,275 and those are the kind which pick-up a hopper or container and pass it up and back over the front of the vehicle to be dumped in a rear storage bin.

The present invention involves a vehicle with front carried hopper on a boom which can raise and lower the hopper for filling and discharge into an aircraft used for dusting, seeding or other material dispensing. The hopper has an improved discharge valve arrangement and safety features ensuring against hopper damage and aircraft damage due to boom power operator failure.

SUMMARY OF THE INVENTION

It is an object of the present invention to provide a construction which enables a frame system to be conveniently pivotally mounted on a truck supplemented by a piston and cylinder motor link assembly to be utilized with the frame in a double acting manner to position the hopper carrier at the end of the boom in a proper and secure position for safety loading material into a dusting airplane.

It is also an object of the present invention to provide a structure for maintaining the boom in its loading position together with a safety bar brace device which will prevent inadvertently boom lowering due to a failure of the hydraulic system.

A still further object resides in the provision of an improved yet simple and conveniently operable mechanism for properly dispensing material from a front loader hopper into an aircraft with better control during the aircraft loading operation.

Further objects reside in the combined utilization of all of the above mentioned features in a front loading vehicle with front boom and hopper to provide a reliable loader which can be safely directed into an aircraft filling position and operated by one person.

Further novel features and other objects of this invention will become apparent from the following detailed description, discussion, and the appended claims taken in conjunction with the accompanying drawings.

BRIEF DESCRIPTION OF DRAWINGS

A preferred structural embodiment of this invention is disclosed in the accompanying drawings in which:

FIG. 7 is a reduced size perspective sketch illustrating a truck with the hopper and boom in position to load an airplane.

GENERAL DESCRIPTION

Figure 1:
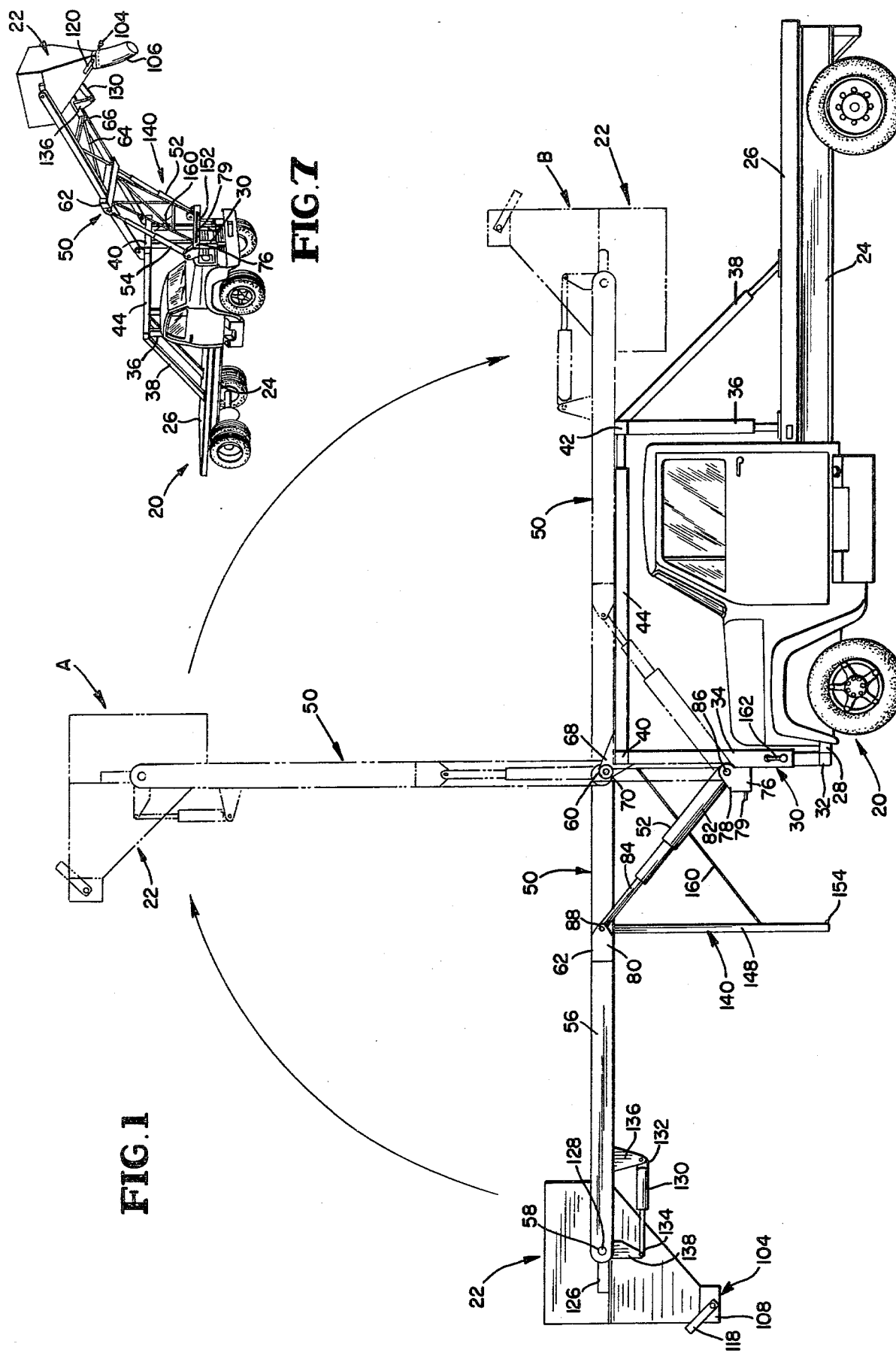
FIG. 1 is a side view of a truck showing the mounting frame for the loading system with the various positions of the boom and hopper, in its movement from loading to storing position, being shown in phantom lines.

With reference to the drawings, particularly FIGS. 1 and 7, there is illustrated a flat bed truck 20 upon which the front loading structure with its discharge hopper 22 is assembled to provide the complete aircraft loader. The truck 20 has a main frame with side rails 24 which carry the truck bed 26 and forward frame rails 28 to which the truck front bumper is normally secured.

A base framework structure assembled on the truck and to which the hopper boom is pivotally secured has a lower front U-bracket 30 fabricated from a bottom steel box beam 32 and vertical side beams 34. The bottom beam 32 is rigidly secured, as by bolts or welding, to the bumper support portions of the frame rails 28. Rear box beam pillars 36 are bolted to the truck frame 24 through the bed 26 and diagonal brace beams 38 are welded to the upper ends of the rear pillars 36 and bolted through the truck bed to the frame 24. At the upper ends of the front U-bracket a front lateral box beam 40 is welded or otherwise rigidly secured. Similarly a rear lateral box beam 42 is welded to the upper ends of the rear pillars 36 and longitudinal side tie beams 44 extend between and are rigidly fastened, as by welding, to the two beams 40 and 42. This frame constitutes a strong, very rigid support base for the arcuately pivotable hopper boom 50 and its two hydraulic piston-cylinder motors 52 and 54.

The hopper boom 50 is a box frame boom with parallel side channel beams 56, each fabricated at its front end with a hopper pivot journal 58 and at its rear end with a boom pivot journal 60. At an intermediate location the boom has a fabricated cross beam construction 62 serving as the attachment beam for the hydraulic motors, as will be described. Additional cross and diagonal beams 64 and 66 (FIG. 7) provide bracing and rigidity to the boom 50.

Spaced apart sets of bracket lugs 68 are welded to the forward cross beam 40 and provide forked pivot ears for the mounted ends of beams 56. The journals 60 of each beam 56 are secured in forked lugs 68 by pivot pins or bolts 70. As shown in FIG. 1 the boom 50, thus secured to the support structure, can swing in an arc from a forwardly projected condition shown in solid lines, up through the vertical position A (phantom lines) and back to a rear storage position B (phantom lines), where the boom 50 abuts, and will be supported in a rest position on the rear cross beam 42.

Placed laterally across and secured, as by welding, to an intermediate location on the front faces of the forward U-frame side beams 34 is a heavy box beam 76 which extends beyond the side beams and at each end has a set of lugs welded thereto to form forked pivot mounts 78 for the boom operating motors 52. A flat horizontal heavy steel step 79 is welded to the front face of cross beam 76 and serves as an abutment stop for the safety latch structure in a manner to be set forth.

As has been described, a fabricated cross beam construction 62 is located intermediate the ends of boom 50. The ends of that beam 62 project beyond the boom side beams 56 and on each end carry a pair of lugs, secured as by welding, which serve as upper end forked pivot structure 80 for respective ones of the boom operating motors 52. These fork structures 80 are aligned with the associated motor pivot attachment fork mounts 78 located on the support frame.

Figure 8:
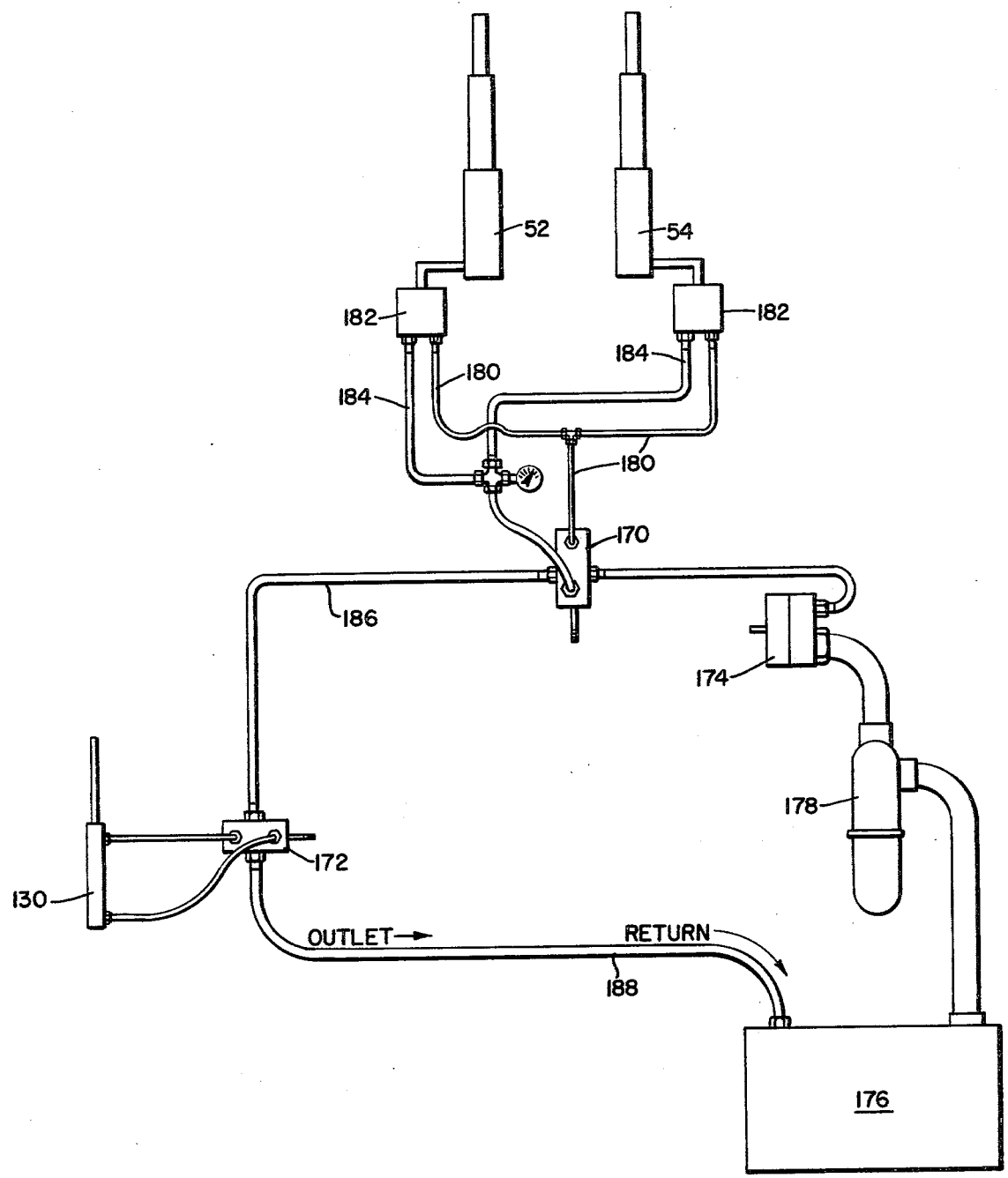
FIG. 8 is a schematic diagram of a hydraulic system which can be used to power the boom system.

Each of the piston-cylinder motors 52 is a double acting telescoping hydraulic motor with connecting eyes at the lower end of the cylinder 82 and at the extensible end of the piston rod 84. Each motor 52 is mounted between an aligned set of the forked pivot connections 78 and 80 and secured by conventional pivot pins or pivot bolts 86 and 84 respectively. The hydraulic motors are operated and controlled in a conventional manner by a fluid pressure system such as shown in FIG. 8 and which will be briefly described hereinafter.

A hopper 22 is carried by the boom 50, and is used to transfer particulate material, such as seeding, crop dusting with insecticides, etc. from an initial hopper loading location to a position adjacent the loading hatch of a dusting aircraft and to then discharge the material through the hatch and into the storage bin of the aircraft.

Figure 2:
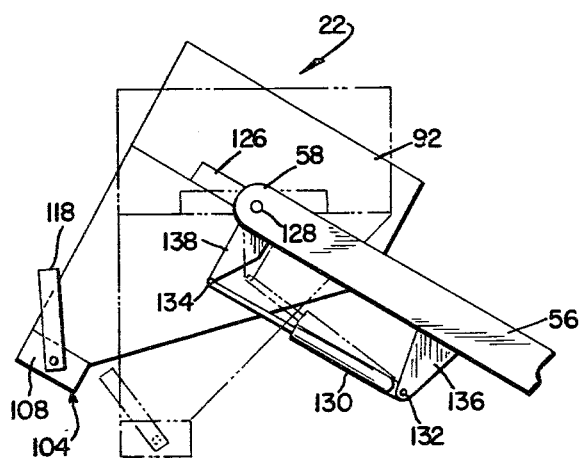
FIG. 2 is a detail side view illustrating the discharge hopper pivoted at the upper end of the boom also showing the hydraulic cylinder fine adjustment of the hopper relative to the end connection on the boom.
Figure 3:
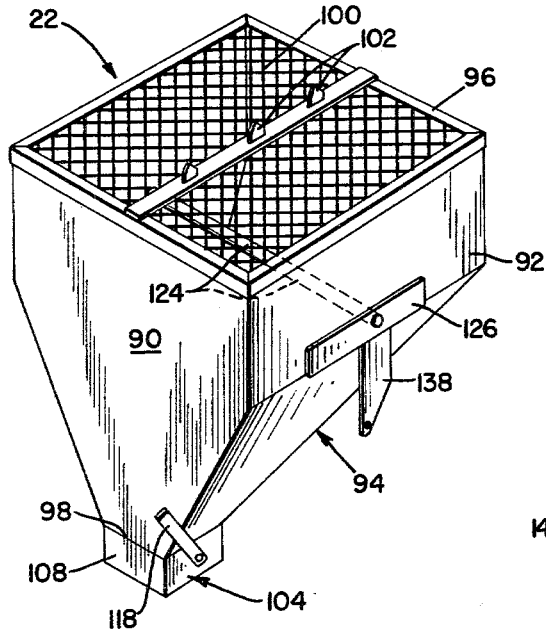
FIG. 3 is a perspective view of the hopper showing various details.

The hopper 22 is shown in FIGS. 1, 2, 3 and 7 and will be described with primary reference to FIGS. 2 and 3. As seen in FIG. 3 hopper 22 is fabricated from sheet metal and has a flat front 90, two bent sides 92 and a bent rear 94 all joined and welded at the edges to provide an open top 96 of a hopper which converges to a lower square discharge end 98. A screen assembly 100 with bag rupturing spikes 102 is secured over the top end of hopper 22. To this point the hopper can be considered as conventional structure.

Figure 5:
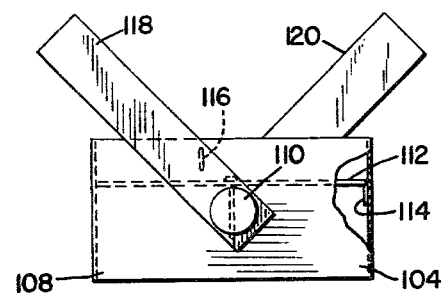
FIGS. 5 and 6 are enlarged detail views of the discharge port control valve with its butterfly flap shown in a closed and open position, respectively.
Figure 6:
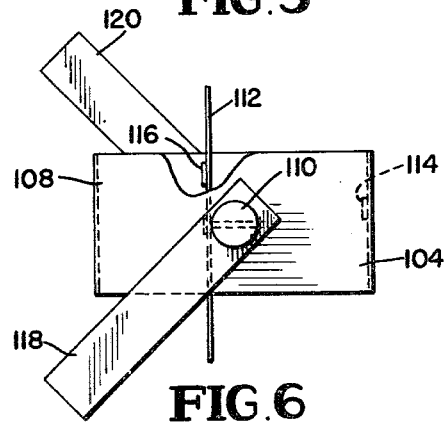

Fastened as by welding to the lower hopper end 98 is a box shaped discharge control valve 104 which will be later described in more detail with reference to FIGS. 5 and 6. Sufficient to say at this stage that a flexible discharge tube 106, such as seen in FIG. 7, may be clamped over the body of valve 104 to provide a conduit for convenient insertion through the storage compartment hatch of an dusting aircraft. If a more expensive hopper convergent transition is used the lower discharge end can be a circular lower opening and the valve 104 can be made as a round valve.

Whether round or square, valve 104 consists of a peripheral body 107 through which projects a transverse axle 110 journaled for rotation at the mid-points of opposed sides of the square body or diagonally across a cylindrical valve body. Within the valve body is a butterfly valve member 112 rigidly secured to the axle 110 by rivets or the like and pivotable between a closed position (FIG. 5) and an open position (FIG. 6). In the closed position, butterfly member 112 is limited by a stop lug 114 welded or otherwise secured to the inside wall of valve body 108. In the open position, butterfly member 112 should be vertically disposed to provide minimum blockage to material discharge and this position can be assured by limiting abutment of butterfly 112 against a cross bar 116 disposed across the inside of valve body 104, parallel to the butterfly axle 110 and secured to the body 104 as by welding.

Normally, material discharge will be controlled by an operator at the aircraft loading hatch. Two bar-shaped handles 118 and 120 are non-rotatably fastened by suitable pins or clamps to respective ends of the butterfly axle. The two manual operating bars are located in a specific offset relationship to the butterfly and to each other. Shown in the valve closed position, FIG. 5, the butterfly is horizontal and the handle bars 118 and 120 extend up at approximately 45° and 135° with respect to a horizontal plane. Thus, the weight of one handle is balanced against that of the other so the weight of the handles do not tend to bias the butterfly in either direction. When the operator swings either handle to open the valve, the combined weight of both handles will tend to cause the butterfly to move and stay in the full open position of FIG. 6.

Turning back now to FIGS. 1, 2 and 7 it is seen that hopper 22 is suspended in a pivoted fashion on the end journals 58 of the hopper boom side beams 56. As shown in FIG. 3 a steel pivot tube 124 is located inside the hopper 22 and extends between and through the upper portions of the hopper side walls and is welded to the hopper side walls together with rigid reinforcing plates 126. Journal pins or an axle 128 (FIG. 2) can extend through the boom hopper pivot journals 58 and into and through the hopper pivot tube 124 to enable the boom to pivotally carry the hopper. Because the pivot rod 124 is located above the effective center of mass of the volumetric space in the hopper, gravity would normally keep the hopper swivelled to an approximate vertical position. However, to provide a controlled positioning of the hopper, for fine positioning when loading an aircraft and to hold an empty hopper in a storage position (see phantom positions A and B in FIG. 1) provision is made to control the hopper pivot position by an auxiliary hydraulic motor 130. Motor 130 is a double acting piston cylinder motor with a connecting eye on the cylinder end 132 and a connecting eye on the extensible piston rod end 134. Cylinder eye 132 is pivotally connected to a bracket lug 136 welded to the lower flange of side beam 56 and the piston eye 134 is pivotally connected to a short depending lever bracket 138 welded rigidly to the plate 126 as shown in FIG. 3. Extension or retraction of the piston rod of hopper motor 130 under operator control will tilt the hopper 22 about its pivot axle 128. The operating power for motor 130 is obtaining from a conventional hydraulic system on the truck as shown in FIG. 8.

Figure 4:
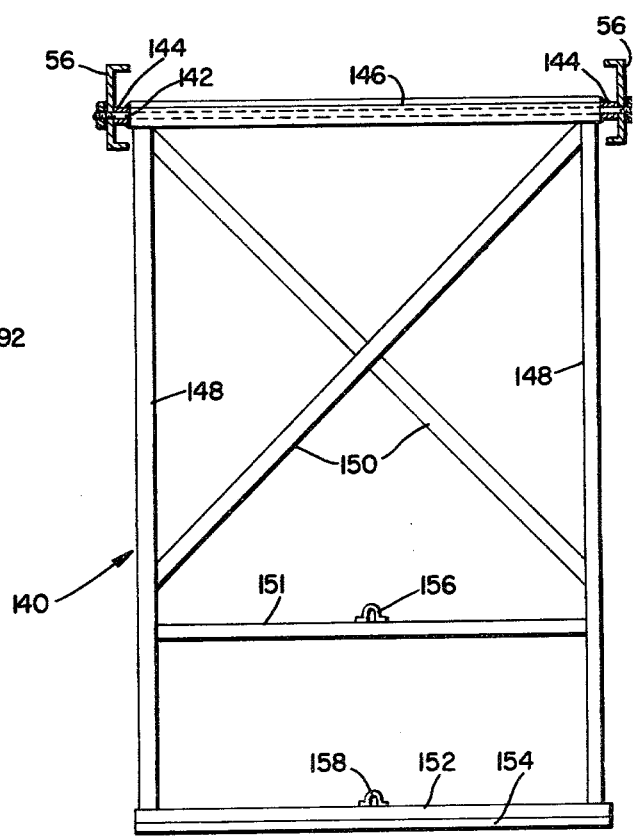
FIG. 4 is a plan view of the safety bar frame assembly.

To provide a safety feature to prevent inadvertent lowering of the boom when not in a storage position, a safety bar assembly 140 (FIGS. 1 and 4) is provided. Assembly 140 is fabricated as a box frame made from channel beams and pivotally hung from a support rod 142 secured laterally between and to the side channel beams 56 of the hopper boom 50 at a location just behind the main motor connections to the boom. The pivot rod will extend through journal sleeves 144 secured, by welding, to the top beam 146 of the safety bar assembly 140. The assembly 140 has side channels 148 and cross channel bracing 150 which are fabricated as by welding. The bottom of the safety assembly is a channel member 152 with a heavy flange 154 facing to the rear. Eye brackets 156 and 158 are fastened to a cross beam 151 and to bottom channel 152, respectively, for a purpose to be described.

When a hopper is raised to an intermediate position, which can be for transport of a full hopper or for positioning over a dusting aircraft loading hatch, the safety bar assembly is swung to the rear so its lower channel flange 154 will be disposed and maintained just over steel step 79 on the front cross beam 76 (FIG. 1). Should hydraulic pressure fail and the boom and hopper start to drop, the safety bar assembly will abut the step 79 and limit downward shifting of the hopper and boom and prevent damage, particularly to an aircraft.

To swing the safety bar assembly back to a safety position, a cable 160 is secured to the intermediate eye 156 on the safety bar assembly. The cable 160 extends to a conventional cable assembly which is reaved over pulleys (not shown) to a hand crank 162 on the truck support frame. Alternatively, the cable can be fastened to a small electric or hydraulic motor driven winch assembly (not shown) mounted on the truck support frame. Lower channel eye bracket 158 can be used to tie the safety bar in a locked or stored condition.

An essentially conventional hydraulic system will be included with the loader truck. As shown in FIG. 8, the system includes a boom actuator valve 170 and a hopper tilt valve 172 both located inside the truck cab and both being connected to a pump 174 via suitable conduits. The pump 174 draws hydraulic fluid from sump 176 through a filter 178. Boom valve 170 can direct high pressure fluid via line 180 through pressure return check valves 182 to the side of each of the cylinder motors 52 and 54 which causes motor extension. The return lines 184 from motors 52 and 54 are always under pressure and connect through boom control valve 170 and line 186 to the inlet side of the hopper tilt valve 172. Valve 172 controls the two ports of the double acting tilt motor 130 to operate the motor in either direction and to maintain it in a desired position. Return fluid passes via conduit 188 to the sump 176.

OPERATION

The aircraft loader truck 20 is moved to a loading station at which point the hopper and boom are swung from the stored position (point B of FIG. 1) through the top center position (point A of FIG. 1) to the load position which is shown in full lines of FIG. 1. To swing the boom 50 up past dead center the operator actuates the boom control valve to extend the motors 52 and 54. As the boom swings up, its inertia will carry it past the top center position and the operator will then reverse the boom control valve to permit retraction of the motor pistons under the force of the boom and hopper weight. When the boom and hopper descend to the full line position of FIG. 1, the operator will place the control valve 170 in a neutral position to prevent retraction movement of the boom motor pistons. Material to be transported to an aircraft is placed into the hopper 22. It can be dumped from a storage bin or bags of material can be thrown onto the spikes 102 causing bag rupture and flow of material into the hopper.

The boom can then be raised to an intermediate position for transport. The safety bar assembly 140 can be moved back to a blocking position so that inadvertent lowering of the boom will not occur. Similarly the safety bar assembly should be shifted to its safety blocking location (FIG. 7) whenever the truck and hopper are moved to adjacent an aircraft for a filling operation. Dumping of material into the aircraft is done manually by an operator who grasps one of the handles 118 or 120 and swings it forward to open the butterfly member 112 of discharge valve 104.

The support framework and boom construction can be tailored to and installed on a specific truck or can be furnished as an installation kit. In either case it is preferred that the boom and support framework be made from structural steel. A suitable hydraulic pump will have a 40 gallon per minute capacity. With the large boom cylinders, operating pressure can be kept below 1800 psi to minimize leakage.

The invention may be embodied in other specific forms without departing from the scope, spirit, or essential characteristics thereof. Present embodiments are, therefore, to be considered in all respects as illustrative and not restrictive, the scope and spirit of the invention being indicated by the appended claims rather than by the foregoing description and all changes which come within the meaning and range of equivalency of the claims are, therefore, intended to be embraced therein.

What is claimed and desired to be secured by Letters Patent is:

1. A front loader vehicle for loading particulate materials into material dispensing aircraft for uses such as seeding, crop dusting, fire fighting, and forest defoliation, including a truck vehicle having integral frame structure with front and rear frame portions; a boom support structure having front and rear vertical support members rigidly secured, respectively, to said front and rear frame portions; a boom structure; means pivotally mounting one end of said boom structure to the front vertical support members of said boom support structure to permit swinging of said boom to positions between a forward projection thence up over the truck to a position extending back over the rear portion of the boom support structure; power means and controls therefor for pivoting the boom structure to any position between the forward and rearward positions; a hopper pivotally mounted on a horizontal axis at the other end of said boom structure; and improved structure comprising: link means including a self-contained extensible motor unit connected at one end to said hopper and at the other end to said beam; power means with controls to extend and retract said motor unit to provide level control of the tilt of said hopper; a bottom discharge port for said hopper, a discharge valve means aligned with said discharge port and controls to move said discharge valve means between open and closed conditions; abutment means secured on said front vertical support members; and a safety bar assembly pivotally mounted at one end on said boom structure and having its other end adapted to cooperate with and abut said abutment means on said support frame to block the forward and downward limit position of said boom structure at specific desired limit positions.

2. A front loader vehicle as defined in claim 1 wherein said hopper converges to a discharge end, and said bottom discharge port and said discharge valve means in combination comprise: a through port valve body of sheet metal material secured to the discharge end of said hopper; an axle member extending through the side walls of said valve body across the central area of the through port; a butterfly valving plate secured, within said through port, to said axle for pivotal movement between closed and open positions; abutment stop means on the inside wall surface of said valve body against which said butterfly plate rests in closed position; a cross bar limit member secured within and across the valve body port against which the butterfly plate abuts to limit its open position; and manual operator handles on the ends of said axle which project outside said valve body.

3. In the front loader vehicle as defined in claim 2, said hopper having a convergent transition to a circular discharge end, said valve body being of cylinder shape and said butterfly plate being circular.

4. In the front loader vehicle as defined in claim 2, said hopper having a rectangular cross-section at its discharge end, said valve body having a cross-section of similar rectangular shape, said butterfly plate having a substantially similar rectangular shape, and said axle extends through mid points of and normal to one set of opposed side walls of the valve body.

5. In a front loader vehicle as defined in claim 2, said manual operator handles being elongated members non-rotatably secured to repective projected ends of said valve body axle and extending upward at opposite angles.

6. A front loader vehicle as defined in claim 1 wherein said link means with extensible motor unit includes a fixed mounting bracket on said boom, a depending lever member rigidly secured to depend from said hopper, and a double acting hydraulic cylinder-piston motor connected as an extensible link between said mounting bracket and said depending lever member.

7. A front loader vehicle as defined in claim 1 wherein said safety bar assembly comprises: a fabricated steel box frame, means at one end edge of said frame pivotally mount the frame to an intermediate portion of the boom structure, an abutment means is rigid with an opposite end edge of said frame, and a second abutment means parallel with said first abutment means is rigid with the front support structure for said boom; whereby said safety bar assembly is swingable to dispose its lower edge abutment means adjacent to and immediately above the second abutment means when the boom structure is in a raised position to enable discharge of material into an aircraft so that inadvertent lowering of the boom structure will be blocked by engagement of the two abutment means.

8. A front loader vehicle as defined in claim 1 wherein said discharge valve means is a butterfly valve means.

* * * * *